United States Patent
Bin

(10) Patent No.: US 9,452,566 B2
(45) Date of Patent: Sep. 27, 2016

(54) PRODUCTION TECHNOLOGY OF PET URINAL PAD HAVING DEAMMONIATION FUNCTION AND HIGH SALINE WATER ABSORPTION ABILITY

(71) Applicant: Jiangsu Zhongheng Pet Articles Joint-Stock Co., Ltd., Jiangsu (CN)

(72) Inventor: Qiu Bin, Jiangsu (CN)

(73) Assignee: Jiangsu Zhongheng Pet Articles Joint-Stock Co., Ltd., Jiangsu (CN)

( * ) Notice: Subject to any disclaimer, the term of this patent is extended or adjusted under 35 U.S.C. 154(b) by 0 days.

(21) Appl. No.: 14/924,597

(22) Filed: Oct. 27, 2015

(65) Prior Publication Data

US 2016/0114528 A1    Apr. 28, 2016

(30) Foreign Application Priority Data

Oct. 27, 2014    (CN) .......................... 2014 1 0577853

(51) Int. Cl.
*B29C 67/00* (2006.01)
*A01K 1/015* (2006.01)

(52) U.S. Cl.
CPC ......... *B29C 67/0011* (2013.01); *A01K 1/0157* (2013.01)

(58) Field of Classification Search
CPC .................... B29C 67/0011; A01K 1/0157

USPC .......................................................... 156/279
See application file for complete search history.

(56) References Cited

U.S. PATENT DOCUMENTS 5,819,688 A * 10/1998 Walker ................. A01K 1/0353
119/169
2012/0132147 A1 * 5/2012 Cheng ................. A01K 1/0107
119/161

* cited by examiner

*Primary Examiner* — Daniel Lee
(74) *Attorney, Agent, or Firm* — Osha • Liang LLP

(57) ABSTRACT

A method for making a pet urinal pad having deammoniation function and high saline water absorption ability comprising the following steps: (A) milling and sieving natural zeolites to obtain zeolite powder having a particle size smaller than 100 microns; (B) immersing the zeolite powder into 1 mol/L sulfuric acid to process for 10-60 minutes under a processing temperature of 50-80° C.; performing vacuum filtration and drying on the processed zeolite powder to obtain acidulated zeolite; (C) adding 2-10 parts of acidulated zeolite into 100 parts of super absorbent resin, thoroughly and uniformly mixing to obtain a mixture; (D) attaching the mixture formed in step (C) to wood pulp paper to form a deodorization water absorption layer; and (E) covering the deodorization water absorption layer with a PE film as the backsheet and a non-woven fabric as the topsheet to form the pet urinal pad having the deammoniation function and the high saline water absorption ability.

2 Claims, No Drawings

PRODUCTION TECHNOLOGY OF PET URINAL PAD HAVING DEAMMONIATION FUNCTION AND HIGH SALINE WATER ABSORPTION ABILITY

CROSS-REFERENCE TO RELATED APPLICATIONS

This Application claims the priority of Chinese Application No. CN201410577853.1, filed on Oct. 27, 2014, the disclosure of which is incorporated by reference in its entirety.

TECHNICAL FIELD

The present invention relates to a method for making pet urinal pads, and more specifically, to a method for making pet urinal pads having a deammoniation function and a high saline water absorption ability.

BACKGROUND ART

Presently, with the improvement of people's living standard, pets like cats, dogs or the like are playing an increasingly important role in people's lives. People are also demanding more for the sanitation of their pets. But in daily life, the disposal of pet excreta requires considerable attention from pet owners. Pet urinal mats have been used to protect environments, to create a more comfortable habitat for pets, and to reduce the amount of work for the people cleaning up after the pets. Super absorbent resin, which is a kind of water-swelling functional polymer material having super-hydrophilic groups, is added in the production process of the pet urinal pad, providing increased water absorption capacity, increased water absorption speed, no dehydration under pressure, strong water retaining capacity, and the like. Although the super absorbent resin can absorb water amounting to several hundred and even several thousand times of its weight, the anti-electrolytic property of super absorbent resin is poor, and the saline water absorption ability thereof is only about 10% of that of deionized water. Because pet urine includes electrolytes such as Na+, K+ and the like, pet urine may be completely absorbed only when more super absorbent resins are included in the pet urinal pad. Because pet urine includes urea, which can be transformed into ammonia gas, the pet urinal pad may have an unpleasant odor, and the environmental health may be affected if it is not timely treated.

SUMMARY OF THE INVENTION

The technical problem to be solved by the present invention is: to provide a method for making pet urinal pads having a deammoniation function and a high saline water absorption ability.

The following method for making pet urinal pads having a deammoniation function and a high saline water absorption ability is provided to solve the aforementioned technical problem, comprising the following steps:

A. milling and sieving natural zeolites to obtain zeolite powder having a particle size smaller than a selected size, such as 1 mm, preferably 500 microns, and more preferably 100 microns;

B. immersing the zeolite powder into 1 mol/L sulfuric acid for a selected duration, such as 10-60 minutes, under a selected processing temperature, such as 50-80° C.; performing vacuum filtration and drying on the processed zeolite powder to obtain acidulated zeolite;

C. adding an appropriate amount (such as 1-50 parts, preferably 2-10 parts) of acidulated zeolite into 100 parts of an absorbent resin (any suitable absorbent resins known in the art for pet urine pads may be used), thoroughly and uniformly mixing to obtain a mixture;

D. attaching the mixture in step (C) to wood pulp paper to form a deodorization water absorption layer; and E. covering the deodorization water absorption layer with a PE film as the backsheet and a non-woven fabric as the topsheet to form the pet urinal pad having deammoniation function and high saline water absorption ability.

Advantages of one or more embodiments of the present invention include the following. The aforementioned method for making the pet urinal pad having deammoniation function and high saline water absorption ability is based on the method for making conventional pet urinal pads with only additional procedures of powder milling, drying and mixing and the like, which can be processed by a commonly-used chemical processing method. Therefore, less equipment is required, and the operation is simple. In addition to the conventional urinal pad components, the pet urinal pad is also added with acidulated zeolite powder having deodorization and ion exchange functions so that the pet urinal pad has deammoniation function and high saline water absorption ability.

DETAILED DESCRIPTION

Details of the present invention will be described hereinafter with specific embodiments.

The method for making the pet urinal pad having deammoniation function and high saline water absorption ability comprises the following steps:

A. milling and sieving natural zeolites to obtain zeolite powder having a particle size smaller than 100 microns;

B. immersing the zeolite powder into 1 mol/L sulfuric acid to process for 10-60 minutes under a processing temperature of 50-80° C.; performing vacuum filtration and drying on the processed zeolite powder to obtain acidulated zeolite;

C. adding 2-10 parts of acidulated zeolite into 100 parts of super absorbent resin, thoroughly and uniformly mixing to obtain a mixture;

D. attaching the mixture formed in the step (C) to wood pulp paper to form a deodorization water absorption layer; and E. covering the deodorization water absorption layer with a PE film as the backsheet and a non-woven fabric as the topsheet to form the pet urinal pad having deammoniation function and high saline water absorption ability.

The aforementioned method for making the pet urinal pad having deammoniation function and high saline water absorption ability is based on the method for making conventional pet urinal pads with only additional procedures of powder milling, drying and mixing and the like, which can be processed by a commonly-used chemical processing method. Therefore, less equipment is required, and the operation is simple. In addition to the conventional urinal pad components, the pet urinal pad is also added with acidulated zeolite powder having deodorization and ion exchange functions, so that the pet urinal pad has deammoniation function and high saline water absorption ability.

The zeolite powder contains alkaline metal and alkali earth metal ions; after acidification, these metal ions are substituted by hydrogen ions; when the acidulated zeolite is contacted with urine, an ion exchange reaction occurs, and the inorganic salt in the urine is absorbed, and the concentration of the inorganic salt in the urine is reduced, and thus the urine absorption ability of the urinal pad is greatly increased.

The inside of the acidulated zeolite is filled with wispy holes and channels, wherein these holes and channels have ammonia-absorbing capability. Meanwhile, the replacement of H+ ion after the ion exchange reaction of the acidulated zeolite powder keeps the urine to be slightly acidic, and thus keeps the ammonia in the urine under an NH4+ state which can be fixed by super absorbent resin, resulting in a reduction of the production of ammonia gas.

Embodiment 1

A method for making a pet urinal pad having deammoniation function and high saline water absorption ability comprising the following steps:

A. milling and sieving natural zeolites to obtain zeolite powder having a particle size smaller than 100 microns;

B. immersing the zeolite powder into 1 mol/L sulfuric acid to process for 10 minutes under a processing temperature of 50° C.; performing vacuum filtration and drying on the processed zeolite powder to obtain acidulated zeolite;

C. adding 2 g of acidulated zeolite into 100 g of super absorbent resin, thoroughly and uniformly mixing to obtain a mixture;

D. attaching the mixture formed in the step (C) to wood pulp paper to form a deodorization water absorption layer; and E. covering the deodorization water absorption layer with a PE film as the backsheet and a non-woven fabric as the topsheet to form the pet urinal pad having deammoniation function and high saline water absorption ability.

5 g of the mixture of the super absorbent resin and acidulated zeolite was placed in a certain volume of urine; after the mixture is saturated by absorbing the urine, the urine was sieved by a 100-mesh wire screen to drain redundant urine, then all the gel mass was weighed and the urine absorption multiplying factor was calculated which was 85.3 g/g. The same process was employed for the measurement of the saline water absorption multiplying factor of the super absorbent resin which was 60.4 g/g.

4000 ml fresh pet urine was collected and equally divided into 10 parts; five of the aforementioned urinal pads and five of the conventional urinal pads (without acidulated zeolite) were used to absorb 200 ml pet urine respectively. The two types of urinal pads were placed into a closed container with a volume of 1000 cm3 respectively, and the ammonia gas concentrations were determined after 24 hours. The result showed that the average concentration of the ammonia gas in the container with the urinal pads was 32% of that with the conventional urinal pads.

Embodiment 2

A method for making a pet urinal pad having deammoniation function and high saline water absorption ability comprising the following steps:

A. milling and sieving natural zeolites to obtain zeolite powder having a particle size smaller than 100 microns;

B. immersing the zeolite powder into 1 mol/L sulfuric acid to process for 20 minutes under a processing temperature of 60° C.; performing vacuum filtration and drying on the processed zeolite powder to obtain acidulated zeolite;

C. adding 4 g of acidulated zeolite into 100 g of super absorbent resin, thoroughly and uniformly mixing to obtain a mixture;

D. attaching the mixture formed in the step (C) to wood pulp paper to form a deodorization water absorption layer; and E. covering the deodorization water absorption layer with a PE film as the backsheet and a non-woven fabric as the topsheet to form the pet urinal pad having deammoniation function and high saline water absorption ability.

5 g of the mixture of the super absorbent resin and acidulated zeolite was placed in a certain volume of urine; after the mixture is saturated by absorbing the urine, the urine was sieved by a 100-mesh wire screen to drain redundant urine, then all the gel mass was weighed and the urine absorption multiplying factor was calculated which was 96.1 g/g. The same process was employed for the measurement of the saline water absorption multiplying factor of the super absorbent resin which was 60.4 g/g.

4000 ml fresh pet urine was collected and equally divided into 10 parts; five of the aforementioned urinal pads and five of the conventional urinal pads (without acidulated zeolite) were used to absorb 200 ml pet urine respectively. The two types of urinal pads were placed into a closed container with a volume of 1000 cm3 respectively, and the ammonia gas concentrations were determined after 24 hours. The result showed that the average concentration of the ammonia gas in the container with the urinal pads was 29% of that with conventional urinal pads.

Embodiment 3

A method for making a pet urinal pad having deammoniation function and high saline water absorption ability comprising the following steps:

A. milling and sieving natural zeolites to obtain zeolite powder having a particle size smaller than 100 microns;

B. immersing the zeolite powder into 1 mol/L sulfuric acid to process for 30 minutes under a processing temperature of 70° C.; performing vacuum filtration and drying on the processed zeolite powder to obtain acidulated zeolite;

C. adding 6 g of acidulated zeolite into 100 g of super absorbent resin, thoroughly and uniformly mixing to obtain a mixture;

D. attaching the mixture formed in the step (C) to wood pulp paper to form a deodorization water absorption layer; and E. covering the deodorization water absorption layer with a PE film as the backsheet and a non-woven fabric as the topsheet to form the pet urinal pad having deammoniation function and high saline water absorption ability.

5 g of the mixture of the super absorbent resin and acidulated zeolite was placed in a certain volume of urine; after the mixture is saturated by absorbing the urine, the urine was sieved by a 100-mesh wire screen to drain redundant urine, then all the gel mass was weighed and the urine absorption multiplying factor was calculated which was 110.8 g/g. The same process was employed for the measurement of the saline water absorption multiplying factor of the super absorbent resin which was 60.4 g/g.

4000 ml fresh pet urine was collected and equally divided into 10 parts; five of the aforementioned urinal pads and five of the conventional urinal pads (without acidulated zeolite) were used to absorb 200 ml pet urine respectively. The two types of urinal pads were placed into a closed container with a volume of 1000 cm3 respectively, and the ammonia gas concentrations were determined after 24 hours. The result showed that the average concentration of the ammonia gas in the container with the urinal pads was 26% of that with the conventional urinal pads.

Embodiment 4

A method for making a pet urinal pad having deammoniation function and high saline water absorption ability comprising the following steps:

A. milling and sieving natural zeolites to obtain zeolite powder having a particle size smaller than 100 microns;

B. immersing the zeolite powder into 1 mol/L sulfuric acid to process for 40 minutes under a processing temperature of 75° C.; performing vacuum filtration and drying on the processed zeolite powder to obtain acidulated zeolite;

C. adding 8 g of acidulated zeolite into 100 g of super absorbent resin, thoroughly and uniformly mixing to obtain a mixture;

D. attaching the mixture formed in the step (C) to wood pulp paper to form a deodorization water absorption layer; and E. covering the deodorization water absorption layer with a PE film as the backsheet and a non-woven fabric as the topsheet to form the pet urinal pad having deammoniation function and high saline water absorption ability.

5 g of the mixture of the super absorbent resin and acidulated zeolite was placed in a certain volume of urine; after the mixture is saturated by absorbing the urine, the urine was sieved by a 100-mesh wire screen to drain redundant urine, then all the gel mass was weighed and the urine absorption multiplying factor was calculated which was 120.4 g/g. The same process was employed for the measurement of the saline water absorption multiplying factor of the super absorbent resin which was 60.4 g/g.

4000 ml fresh pet urine was collected and equally divided into 10 parts; five of the aforementioned urinal pads and five of the conventional urinal pads (without acidulated zeolite) were used to absorb 200 ml pet urine respectively. The two types of urinal pads were placed into a closed container with a volume of 1000 cm3 respectively, and the ammonia gas concentrations were determined after 24 hours. The result showed that the average concentration of the ammonia gas in the container with the urinal pads was 25% of that with the conventional urinal pads.

Embodiment 5

A method for making a pet urinal pad having deammoniation function and high saline water absorption ability comprising the following steps:

A. milling and sieving natural zeolites to obtain zeolite powder having a particle size smaller than 100 microns;

B. immersing the zeolite powder into 1 mol/L sulfuric acid to process for 60 minutes under a processing temperature of 80° C.; performing vacuum filtration and drying on the processed zeolite powder to obtain acidulated zeolite;

C. adding 10 g of acidulated zeolite into 100 g of super absorbent resin, thoroughly and uniformly mixing to obtain a mixture;

D. attaching the mixture formed in the step (C) to wood pulp paper to form a deodorization water absorption layer; and E. covering the deodorization water absorption layer with a PE film as the backsheet and a non-woven fabric as the topsheet to form the pet urinal pad having deammoniation function and high saline water absorption ability.

5 g of the mixture of the super absorbent resin and acidulated zeolite was placed in a certain volume of urine; after the mixture is saturated by absorbing the urine, the urine was sieved by a 100-mesh wire screen to drain redundant urine, then all the gel mass was weighed and the urine absorption multiplying factor was calculated which was 129.8 g/g. The same process was employed for the measurement of the saline water absorption multiplying factor of the super absorbent resin which was 60.4 g/g.

4000 ml fresh pet urine was collected and equally divided into 10 parts; five of the aforementioned urinal pads and five of the conventional urinal pads (without acidulated zeolite) were used to absorb 200 ml pet urine respectively. The two types of urinal pads were placed into a closed container with a volume of 1000 cm3 respectively, and the ammonia gas concentrations were determined after 24 hours. The result showed that the average concentration of the ammonia gas in the container with the urinal pads was 24% of that with the conventional urinal pads.

What is claimed is:

1. A method for producing a pet urinal pad having a deammoniation function and high saline water absorption ability, comprising the following steps:
   (A) milling and sieving natural zeolites to obtain zeolite powder having a particle size smaller than 100 microns;
   (B) immersing the zeolite powder in a sulfuric acid solution to process for 10-60 minutes under a processing temperature of 50-80° C.; performing vacuum filtration and drying on the processed zeolite powder to obtain acidulated zeolite;
   (C) adding 2-10 parts of acidulated zeolite into 100 parts of a super absorbent resin, thoroughly and uniformly mixing to obtain a mixture;
   (D) attaching the mixture formed in step (C) to wood pulp paper to form a deodorization water absorption layer; and
   (E) covering the deodorization water absorption layer with a PE film as the backsheet and a non-woven fabric as the topsheet to form the pet urinal pad.

2. The method according to claim 1, wherein the sulfuric acid solution has a concentration of 1 mol/L.

* * * * *